(12) United States Patent  (10) Patent No.: US 8,347,220 B2
Kikuoka  (45) Date of Patent: Jan. 1, 2013

(54) INFORMATION DISPLAY APPARATUS, METHOD FOR DISPLAYING INFORMATION, PROGRAM, AND RECORDING MEDIUM

(75) Inventor: Yumiko Kikuoka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1105 days.

(21) Appl. No.: 12/249,371

(22) Filed: Oct. 10, 2008

(65) Prior Publication Data

US 2009/0122023 A1 May 14, 2009

(30) Foreign Application Priority Data

Nov. 13, 2007 (JP) ................ 2007-294420

(51) Int. Cl.
*G06F 15/00* (2006.01)
*G06F 13/00* (2006.01)
(52) U.S. Cl. ...................... 715/764; 715/790
(58) Field of Classification Search .......... 715/769, 715/775, 810, 851, 764, 790, 800, 801, 838–841; 345/179, 211

See application file for complete search history.

(56) References Cited

U.S. PATENT DOCUMENTS

2006/0265731 A1* 11/2006 Matsuda ............... 725/131
2007/0057866 A1* 3/2007 Lee et al. .............. 345/1.1

FOREIGN PATENT DOCUMENTS

| JP | 5-12396 A | 1/1993 |
| JP | 7-98769 A | 4/1995 |
| JP | 10-124280 A | 5/1998 |
| JP | 10-322629 A | 12/1998 |
| JP | 11-259237 A | 9/1999 |
| JP | 2001-306210 A | 11/2001 |
| JP | 2002-196739 A | 7/2002 |
| JP | 2006-268263 A | 10/2006 |
| JP | 2007-65914 A | 3/2007 |

* cited by examiner

*Primary Examiner* — Cao "Kevin" Nguyen (74) *Attorney, Agent, or Firm* — Birch, Stewart, Kolasch & Birch, LLP (57) ABSTRACT

An original image is displayed on a display screen. Here, when a sub-screen input mode is set, a sub-screen that is obtained by reducing an entire screen displayed on the display screen is displayed on an image display portion. The user uses an electronic pen to select an optional input area within the sub-screen. An area corresponding to the selected input area is displayed on the entire screen. At this timer, the reduced image of the entire screen is switched to an image of the input area on the sub-screen. Then, the user uses the electronic pen to perform an editing work on the sub-screen. The sub-screen is set within reach of the user, and editing on an area out of reach on the entire screen can be also performed on the sub-screen.

14 Claims, 6 Drawing Sheets

INFORMATION DISPLAY APPARATUS, METHOD FOR DISPLAYING INFORMATION, PROGRAM, AND RECORDING MEDIUM

CROSS-NOTING PARAGRAPH

This Nonprovisional application claims priority under 35 U.S.C. §119(a) on Patent Application No. 2007-294420 filed in JAPAN on Nov. 13, 2007, the entire contents of which are hereby incorporated herein by references.

FIELD OF THE INVENTION

The present invention relates to an information display apparatus, a method for displaying information, a program, and a recording medium, and particularly, to an information display technique on a display screen to which data are input from an operation input portion such as a touch panel.

BACKGROUND OF THE INVENTION

An information display apparatus is known, that a touch panel is provided on a front face of a large-sized liquid crystal display apparatus and the like to input data using an electronic pen etc., so as to be applicable to an electronic blackboard for a conference. Such an information display apparatus to which data can be input using a touch panel is assumed to be used in conference rooms with some space, and a height thereof is within a reach of a person and a width thereof is also in a range that does not hinder a person from moving.

However, as a size of an electronic display becomes larger, and a large-sized information display apparatus is installed in a large space, for example, in an auditorium of a college or in a conference hall in which an international conference is held, there is a problem that a user of the display apparatus can not reach an upper part thereof or that much labor is required for the user to move to an end of a display screen to input data.

In order to solve the aforementioned problem, for example, Japanese Laid-Open Patent Publication No. 2002-196739 discloses, as a system wherein drawing on a large display is easily performed and detailed display is clearly recognized, a technique that when performing pen input into an image displayed on a large screen or a small screen of a main display, the same contents are also input into an image displayed on the small screen of the main display or a sub-display.

However, the Japanese Laid-Open Patent Publication No. 2002-196739 does not disclose a method for specifying a detailed range where a user wants to input by a touch panel, thus a display area out of reach of the user can not be cut out and it is difficult to perform input into the area.

SUMMARY OF THE INVENTION

An object of the present invention is to provide an information display apparatus and a method for displaying information, that enable to select an optional position on a reduced screen of an entire screen so that an inputting work in an upper part or an end side, out of reach of a user, can be performed easily, and a program for realizing a function of the apparatus, and a recording medium Another object of the present invention is to provide an information display apparatus, comprising: a display portion; an operation input portion for receiving operation input into an image displayed on the display portion; a display control portion for controlling a display screen of the display portion to display an entire screen of the display screen as a sub-screen; and an input area selecting portion for selecting an input area where operation input into the image is performed from an image of the sub-screen in accordance with predetermined operation input to the operation input portion, wherein when an input area is selected from the image of the sub-screen, the display control portion controls the display portion to (re)display an image of the input area on the sub-screen as an input-purpose sub-screen.

Another object of the present invention is to provide the information display apparatus, wherein a normal input mode that permits operation input into the whole area of the display screen of the display portion, or a subs screen input mode that permits operation input into the image of the sub-screen displayed on the display screen of the display portion is set selectively, and when the sub-screen input mode is set, the display control portion reflects operation input performed into the image of the sub-screen to the entire screen for display.

Another object of the present invention is to provide the information display apparatus, wherein the input area selecting portion determines a start point and an end point in the image of the sub-screen and cuts out a rectangle having a diagonal connecting the start point and the end point as an input area.

Another object of the present invention is to provide the information display apparatus, wherein an original image editing mode that permits operation input for performing editing an original image which has been already displayed on the display portion or an original image non-editing mode that does not permit editing the original image is set selectively.

Another object of the present invention is to provide the information display apparatus, wherein, the display control portion controls the display portion to display the images which are permitted to edit and not permitted to edit in different display forms in order to make it possible to determine whether an image displayed on the display portion is the image which is permitted to edit or not.

Another object of the present invention is to provide the information display apparatus, wherein when an input area is selected from the image of the sub-screen, the display control portion controls the display portion to display an image of the input area on the sub-screen as an input-purpose sub-screen, and controls the display portion to display the image of the area selected as the input area and the image of the not-selected areas, among images displayed on the entire screen of the display portion, in different display forms in order to make it possible to determine that the image of the selected area is in editing.

Another object of the present invention is to provide the information display apparatus, which comprises a touch panel as the operation input portion.

Another object of the present invention is to provide a program for causing a computer to realize the function of the information display apparatus.

Another object of the present invention is to provide a recording medium having the program recorded thereon so as to be readable by a computer.

Another object of the present invention is to provide a method for displaying information, comprising: a step of selecting either an original image editing mode that permits operation input for performing editing an original image which has been already displayed on a display portion and an original image non-editing mode that does not permit editing the original image; a step of displaying the images which are permitted to edit and not permitted to edit in different display forms in order to make it possible to determine whether an image displayed on the display portion is the image which is permitted to edit or not; a step of selecting either a normal input mode that permits operation input into whole area of a display screen displayed on the display portion or a sub-screen input mode that permits operation input into a sub-screen that is displayed after reducing an entire screen of the display screen; a step of selecting an input area where input operation into the image is performed from an image of the sub-screen when the sub-screen input mode is selected; and a step of displaying an image of the area selected as an input area and an image of the not-selected areas, among images displayed on the entire screen of the display portion, in different display forms in order to make it possible to determine that the image of the selected area is in editing.

PREFERRED EMBODIMENTS OF THE INVENTION

Figure 1:
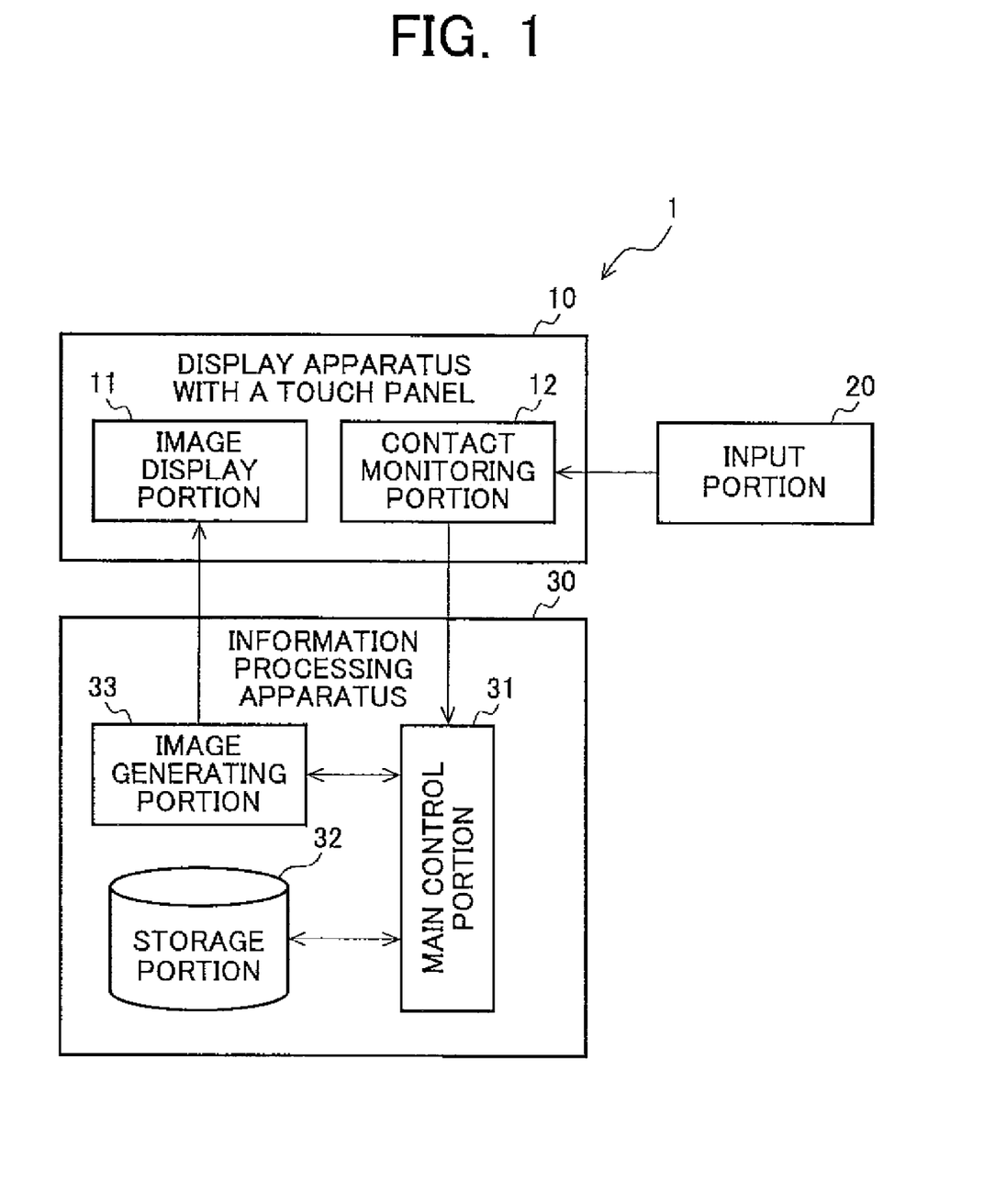
FIG. 1 is a block diagram illustrating an embodiment of an information display apparatus according to the present invention.

FIG. 1 is a block diagram illustrating an embodiment of an information display apparatus according to the present invention. In FIG. 1, an information display apparatus 1 comprises a display apparatus with a touch panel 10, an input portion 20, and an information processing apparatus 30. The display apparatus with a touch panel 10 and the information processing apparatus 30 may be an individual apparatus, respectively or put together in one apparatus.

The display apparatus with a touch panel 10 includes an image display portion 11 composed of a large-sized liquid crystal display with a touch panel and the like, and a contact monitoring portion 12 for monitoring contact states to a touch panel using the input portion 20. The touch panel is disposed on the front of the display-side of the large-sized liquid crystal display and a user is able to perform operation input to the touch panel as the user watches the display screen. The touch panel corresponds to the operation input portion of the present invention, and the large-sized liquid crystal display corresponds to the display portion of the present invention.

The image display portion 11 of the display apparatus with a touch panel 10 displays image data received through an interface from the information processing apparatus 30. Moreover, the contact monitoring portion 12 monitors contact/non-contact of the input portion 20 with the touch panel, a contact position, and the like and transmits the monitored results (a contact state, a contact position, and the like) through the interface to the information processing apparatus 30.

The input portion 20 is a pointing device such as an electronic pen, and when touching the input portion 20 to the touch panel, operation input desired by a user is made possible. In addition, anything that is able to contact with the touch panel of the image display portion 11 is applicable as the input portion 20, for example, a human finger, a pen, or a stick can be used.

The information processing apparatus 30 includes a main control portion 31 for controlling the whole of the apparatus 30, a storage portion 32, and an image generating portion 33. The main control portion 31 controls the whole of the apparatus 30, receives a monitored result transmitted through the interface from the contact monitoring portion 12 of the display apparatus with a touch panel 10, and controls to send a drawing command for drawing at the contact position of the input portion 20 to the image generating portion 33, or to execute a pointing operation at the contact position.

The storage portion 32 of the information processing apparatus 30 is composed of, for example, a RAM (Random Access Memory), a ROM (Read Only Memory), an HDD (Hard Disk Drive), and the like, and stores a control program executed in the main control portion 31, various application programs, and data, or stores data temporarily when the control program and the various application programs are executed.

Moreover, the image generating portion 33 generates image data in accordance with the drawing command received from the main control portion 31 and transmits the generated image data through the interface to the image display portion 11 of the display apparatus with a touch panel 10. The image display portion 11 displays a drawn image or the like corresponding to the contact position of the input portion 20 in accordance with the image data transmitted from the image generating portion 33.

Figure 2:
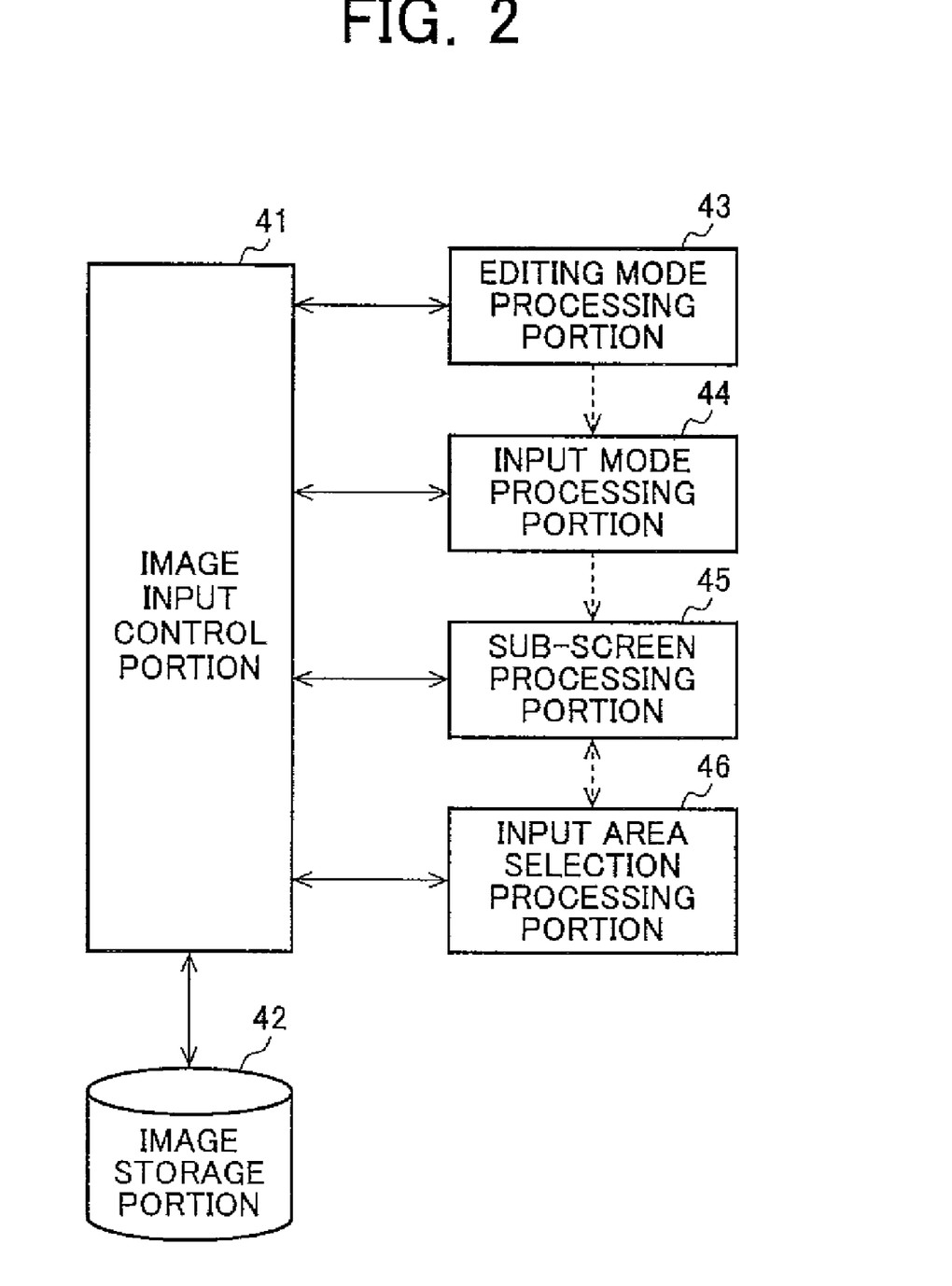
FIG. 2 is a block diagram illustrating the function of an information processing apparatus having the structure shown in FIG. 1.

FIG. 2 is a block diagram illustrating the function of the information processing apparatus having the structure shown in FIG. 1. In FIG. 2, the information processing apparatus 30 includes an image input control portion 41, an image storage portion 42, an editing mode processing portion 43, an input mode processing portion 44, a sub-screen processing portion 45, and an input area selection processing portion 46. Functions of the image input control portion 41, the editing mode processing portion 43, the input mode processing portion 44, the sub-screen processing portion 45, and the input area selection processing portion 46 are realized by the main control portion 31 of FIG. 1. The program to realize these functions is loaded onto a memory such as a RAM from the storage portion 32 and is executed by a CPU (Central Processing Unit) of the main control portion 31.

The image storage portion 42 is a part of the storage portion 32 shown in FIG. 1, and stores image data based on the input by the input portion 20, or stores image data up to input completion in the case of an original image non-editing mode, which will be described later, or an input mode in a sub-input screen.

The image input control portion 41 receives, through the interface, an event based on the input by the input portion 20 that is detected by the contact monitoring portion 12, to control each portion. When the image input control portion 41 receives the new event detected by the contact monitoring portion 12 based on the input of the input portion 20, it starts the editing mode processing portion 43. The new event is an event that is issued when a touch operation is newly performed by the input portion 20 in a state where a display image is not being edited on the display apparatus with a touch panel 10.

When the editing mode processing portion 43 receives an editing mode instruction event showing that an editing mode is instructed by the input portion 20 from the image input control portion 41, it determines whether an original image non-editing mode is selected or an original image editing mode is selected. The original image non-editing mode is a mode that does not allow to edit an original screen which has been already displayed, and the original image editing mode is a mode that allows to edit the original screen which has been already displayed. An operational example of these modes will be described in more detail later.

When the original image non-editing mode is selected by the input portion 20, the editing mode processing portion 43 stores image data of the original screen (the currently displayed screen) in the image storage portion 42. Then, the editing mode processing portion 43 causes the image generating portion 33 to generate image data showing that the original screen can not be edited, and causes the image display portion 11 to display the generated image data. Thereafter, the editing mode processing portion 43 receives an editing mode selection completion event from the image input control portion 41, and starts the input mode processing portion 44.

When the input mode processing portion 44 receives an input mode instruction event showing that an input mode is instructed by the input portion 20 from the image input control portion 41, it determines whether or not the input mode instruction event is in a sub-screen input mode or a normal input mode. The sub-screen input mode is a mode for performing input by the input portion 20 into a sub-screen generated on a display screen of the image display portion 11, and the normal input mode is a mode for allowing a normal input operation into whole area in the display screen of the image display portion 11. An operational example of these modes will be described in more detail later.

When the input mode instruction event indicates the sub-screen input mode, the input mode processing portion 44 starts the sub-screen processing portion 45.

When the sub-screen input mode is selected, the sub-screen processing portion 45 firstly causes the image generating portion 33 to generate image data of an entire screen. At this time, the image generating portion 33 causes the image display portion 11 to display the entire screen. Furthermore, the sub-screen processing portion 45 causes the image generating portion 33 to generate the image data of the entire screen generated by the image generating portion 33 as sub-screen data, and to display the sub-screen data on the image display portion 11. At this time, a sub-screen that is obtained by reducing the entire screen included in the entire screen is displayed on the screen of the image display portion 11.

Thereafter, when the sub-screen processing portion 45 receives a sub-screen display completion event from the image input control portion 41, it starts the input area selection processing portion 46.

When the input area selection processing portion 46 receives an input area selection event showing that an input area is selected by the input portion 20, it causes the image generating portion 33 to generate image data of the selected input area. The input area is selected by the input portion 20 on the sub-screen that is obtained by reducing the entire screen. Here, for example, a start point and an end point of the input area are specified and a rectangular having a diagonal connecting the start point and the end point is selected. In accordance with the control by the sub-screen processing portion 45, the image generating portion 33 extracts image data of the input area input into the sub-screen from the image of the entire screen and displays the image data on the sub-screen. That is, here, the reduced image of the entire screen displayed on the sub-screen is switched to the image of the selected input area. The image of the input area displayed on the sub-screen does not need to be reduced to display, differently from at the time of displaying the entire screen on the sub-screen.

In this way, the image of the input area selected by the user using the input portion 20 is displayed on the sub-screen. In addition, additional writing and editing such as processing and elimination can be performed to the displayed image of the input area. An editing operation performed for the sub-screen is reflected and displayed on the entire screen. Here, the sub-screen is set so as to be displayed in a range within reach of a user, and this makes it possible for the user to select an optional screen area to display on the sub-screen and easily perform an editing operation to the sub-screen.

In the above structure, a display control portion of the present invention that controls the display screen displayed on the display portion is realized by the main control portion 31 of the information processing apparatus 30 and the image generating portion 33 that generates image data in accordance with control by the main control portion 31. Moreover, an input area selecting portion is realized by the contact monitoring portion 12 of the display apparatus with a touch panel 10, the input area selection processing portion 46 realized by the main control portion 31, and the image generating portion 33.

Figure 3A:
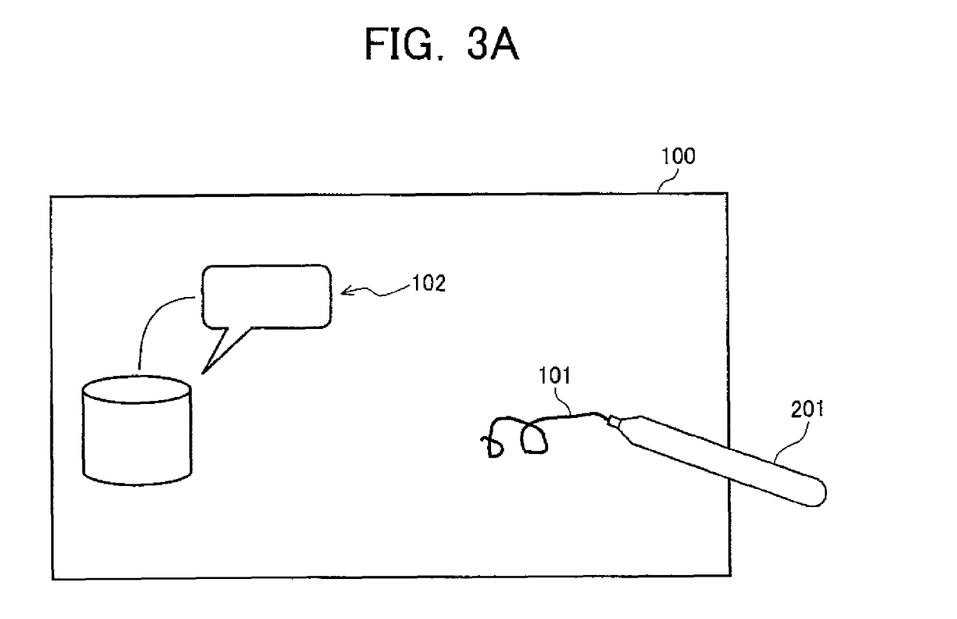
FIGS. 3A and 3B are views illustrating an example of an editing mode set in the information display apparatus of the present invention.
Figure 3B:
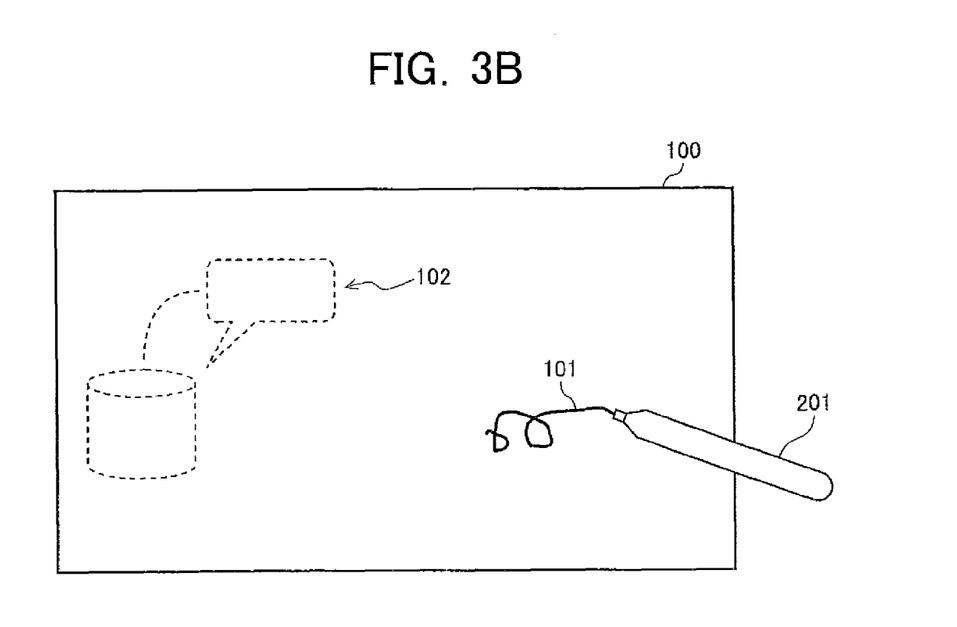

Next, an editing mode selected in the editing mode selection above will be described in more detail. FIGS. 3A and 3B are views illustrating an editing mode. There are two kinds of editing modes that are set in the information display apparatus 1 of the embodiment according to the present invention. A user is able to select either one of the editing modes using the input portion 20.

(A) Original Image Editing Mode

In an original image editing mode, editing an image which has been displayed before editing (an original image) is possible in a display screen displayed on the image display portion 11 of the display apparatus with a touch panel 10, and this mode corresponds to an existing normal editing mode.

When the original image editing mode is set in the information display apparatus 1, a user is able to optionally edit an image displayed on the image display portion 11 of the display apparatus with a touch panel 10 using the input portion 20. For example, it is possible to newly add a drawn image or perform elimination or processing of the currently displayed image. It is also possible to perform a pointing operation of a menu, an icon, and the like displayed on the image display portion 11.

For example, as shown in FIG. 3A, it is assumed that an original image 102 that has been already drawn is displayed on a display screen 100 displayed on the image display portion 11. In the original image editing modes additional drawing and a pointing operation can be performed with the original image 102 displayed in a normal state. For example, the user is able to add a new drawn image 101 using an electronic pen 201, a form of the input portion 20, or the like. It is also possible to conduct an editing work such as elimination and processing of the original image 102 appropriately.

(B) Original Image Non-Editing Mode

In an original image non-editing mode, editing an image which has been displayed before editing is not allowed in the display screen displayed on the display apparatus with a touch panel 10. This original image non-editing mode is applicable to a case where it is desired to write additionally without changing the image drawn by another person. For example, it is useful for a work, such as correction of answers, which overwrites an image drawn by another person or eliminates the overwritten image.

In the information processing apparatus 30, when the original image non-editing mode is set, original image data before edited is stored in the image storage portion 42. Moreover, in order to show that editing the original image is not permitted, image data of the original image in a translucent state is generated by the image generating portion 33 to be displayed on the image display portion 11 of the display apparatus with a touch panel 10. When the editing work by the user on the display screen is completed, in the information processing apparatus 30, the translucent original image is returned to an original state, and image data including editing contents added to the original image data before edited is generated by the image generating portion 33 to be displayed on the image display portion 11.

For example, as shown in FIG. 3B, it is assumed that the original image 102 that has been already drawn is displayed on the display screen 100 displayed on the image display portion 11. In the original image non-editing mode, by displaying the original image 102 in a translucent state, the user is notified that editing the original image 102 is not permitted. Here, without limitation to the translucent state, any display state is applicable as far as the images which are permitted to edit and not permitted to edit are displayed in different display forms in the original image editing mode where editing the original image is permitted and the original image non-editing mode where editing the original image is not permitted. As a result, the user is able to recognize whether a displayed image is permitted to edit or not.

In this state, the user is able to add a new drawn image 101 using the electronic pen 201, a form of the input portion 20, and the like. However, here, the original image 102 is protected and an editing work such as elimination and processing of the original image 102 can not be permitted.

Figure 4:
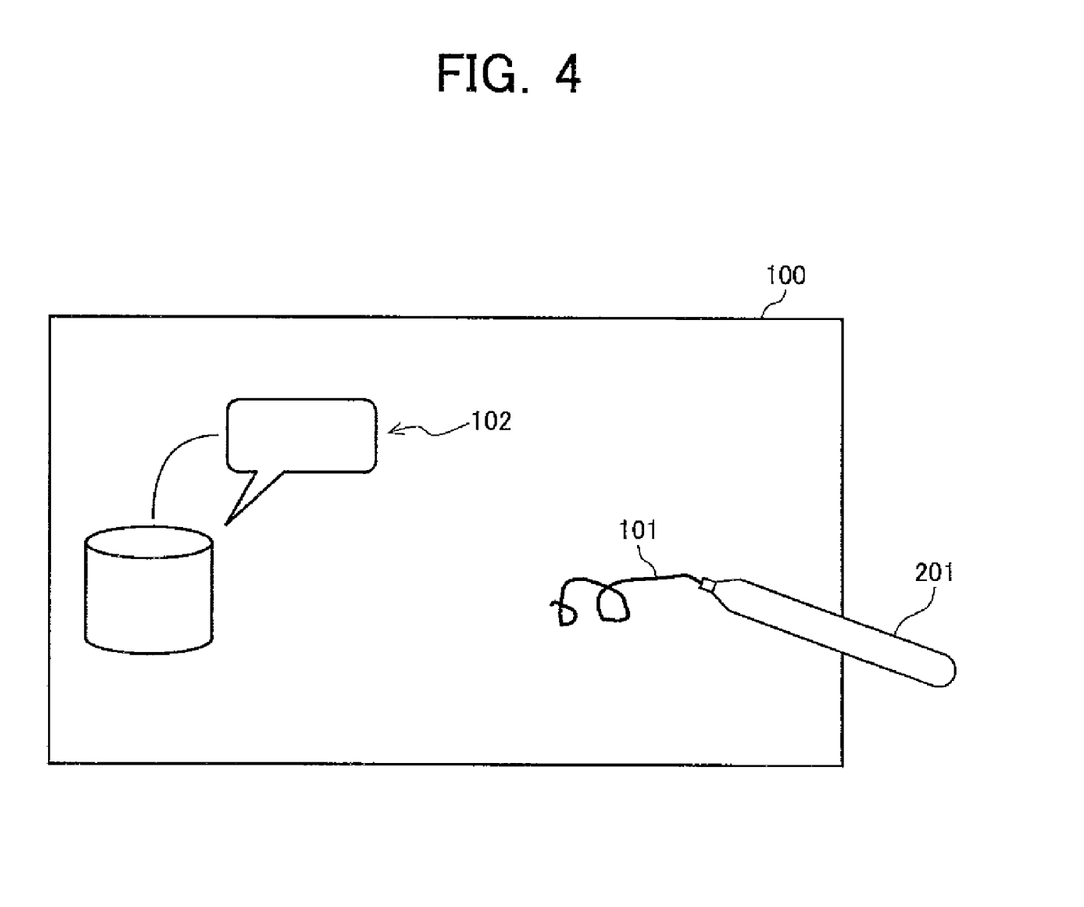
FIG. 4 is a view illustrating an example of an input mode set in the information display apparatus of the present invention.
Figure 5A:
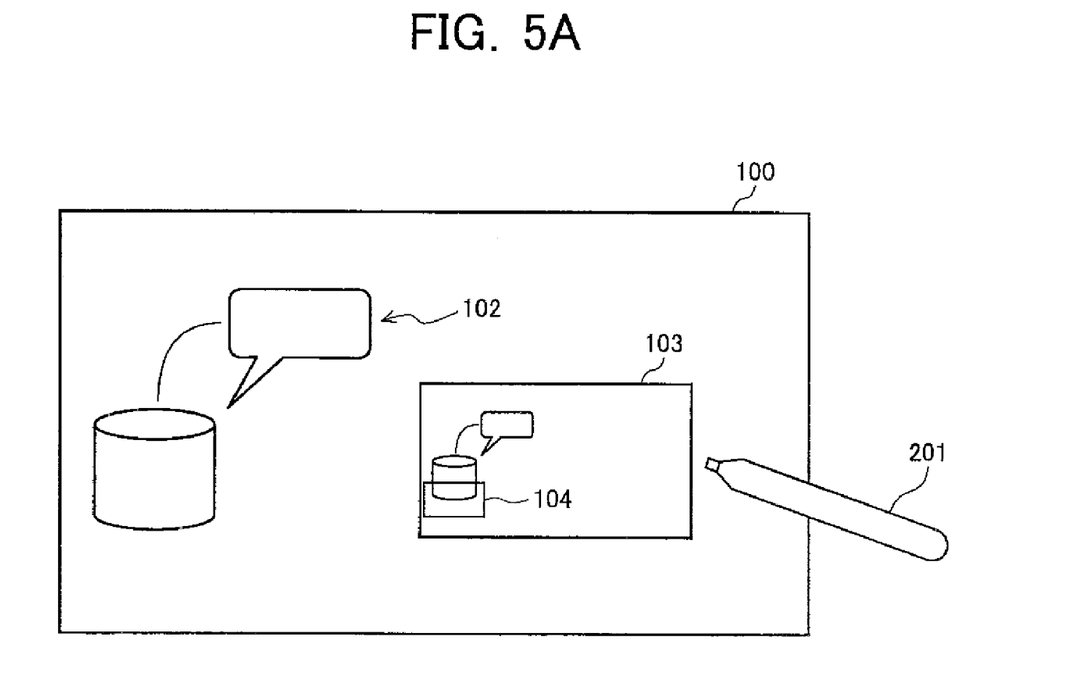
FIGS. 5A and 5B are views illustrating another example of the input mode set in the information display apparatus of the present invention.
Figure 5B:
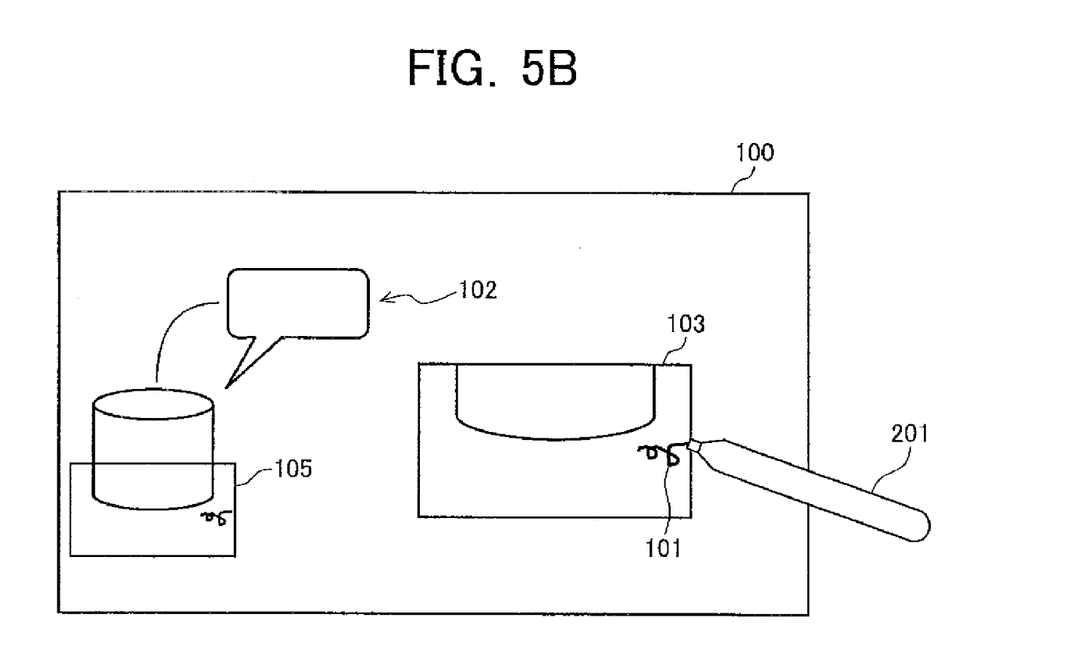

Next, an input mode selected in the input mode selection above will be described in more detail. FIGS. 4 to 5B illustrate an input mode. There are two kinds of input modes that are set in the information display apparatus 1 of the embodiment according to the present invention. A user is able to select either one of the input modes using the input portion 20.

(A) Normal Input Mode

A normal input mode is a mode for performing direct input in whole area of the display screen displayed on the image display portion 11 of the display apparatus with a touch panel 10. In the normal input mode, a user directly touches the touch panel of the display apparatus with a touch panel 10 using the input portion 20, and thereby is able to display a drawn image on the image display portion 11 or execute a pointing operation at the touched position. That is, the normal input mode permits normal input using the input portion 20.

For exampler as shown in FIG. 4, it is assumed that the original image 102 that has been already drawn is displayed on the display screen 100 displayed on the image display portion 11. In the normal input mode, additional drawing and a pointing operation are possible while displaying the original image 102. For example, the user is able to add a new drawn image 101 using the electronic pen 201, a form of the input portion, or the like. In addition, when the original image editing mode is set at this time, it is also possible to perform an editing work such as elimination and processing of the original image 102.

Alternatively, when the original image non-editing mode is set, the original image 102 is not permitted to edit, but an additional writing and a pointing operation are permitted.

(B) Sub-Screen Input Mode

In a sub-screen input mode, in a display screen displayed on the image display portion 11 of the display apparatus with a touch panel 10, an input area is selected on a sub-screen that is obtained by reducing an entire screen and an image of the selected input area is displayed on the sub-screen, so that drawing of an image and an operation such as pointing are performed on the sub-screen. This sub-screen input mode is used to perform drawing and the like in an area out of reach of the user on the display screen of the display apparatus with a touch panel 10.

In the information processing apparatus 30, when the sub-screen input mode is set, sub-screen data for displaying the reduced entire screen is generated by the image generating portion 33 to be displayed on the image display portion 11. Here, an image of the entire screen is displayed over the image display portion 11 and the reduced image of the entire screen is displayed on the sub-screen that is displayed at a predetermined position.

Then, the user uses the input portion 20 to select an area where the user wants to perform editing such as drawing, on the reduced entire image displayed on the sub-screen. The information processing apparatus 30 displays image data of the selected input area on the sub-screen. Here, the image on the sub-screen is switched from the reduced image of the entire screen to the image of the selected input area.

Moreover, the information processing apparatus 30 displays that the selected input area is being edited on the image of the entire screen displayed over the image display portion 11. Various methods, for example, attaching hatching to the input area, coloring the input area, making surroundings of the input area blinked, or the like, can be employed appropriately and optionally to indicate that editing is under way. The user uses the input portion 20 to perform an editing work such as drawing on the sub-screen.

When the information processing apparatus 30 receives an editing work completion event, it returns the display indicating that editing is under way displayed on the image of the entire screen to an original display state, reflects the contents that are additional edited on the sub-screen to the original image before edited, and displays image data of the entire screen reflecting the contents of editing on the image display portion 11.

For example, as shown in FIG. 5A, it is assumed that the original image 102 is displayed on the display screen 100 displayed on the image display portion 11. Here, when the sub-screen input mode is set by an operation of the user, a sub-screen 103 that is obtained by reducing an entire screen displayed over the display screen 100 is displayed on the image display portion 11. A display position of the sub-screen 103 can be determined in advance. In this case, even when the image display portion 11 has a large screen, it is possible to set the display position of the sub-screen 103 within a range of reach of the user and in a vicinity of a side where the user normally stands. In addition, the display position of the sub-screen 103 may be selected from a plurality of display positions prepared in advance, or may be moved appropriately by a drag operation and the like of the input portion 20.

Then, the user uses the input portion such as the electronic pen 201 to select an optional input area 104 from an image displayed on the sub-screen 103. When selecting the input area 104, the user determines a start point and an end point on the screen, for example, using the electronic pen 201, and specifies a rectangular having a diagonal connecting the start point and the end point as the input area 104.

When the input area 104 is selected on the sub-screen 103, as shown in FIG. 5B, an area 105 that corresponds to the input area 104 selected on the sub-screen 103 is displayed on the entire screen displayed over the image display portion 11. At this time, the display indicating that editing is under way is shown on the area 105 using a method, for example, such as hatching. That is, an image of the selected area 105 and an image of a not-selected area are displayed in different display forms so that it can be determined that the image of the area 105 selected as the input area 104 is being edited. Thereby, the user is able to recognize that the image of the selected area 105 is being edited.

In addition, at this time, the image on the sub-screen 103 is switched from the reduced image of the entire screen to the image of the input area 104 selected by the user. Then, the user is able to perform an editing work such as drawing of the drawn image 101 on the sub-screen 103 using the input portion such as the electronic pen 201. Since the sub-screen 103 is set, for example, within the reach of the user, it is possible to perform editing on the area 105 out of reach of the user on the image display portion 11 by the operation on the sub-screen 103. The contents of editing on the sub-screen 103 are reflected to the entire screen that is displayed over the image display portion In the aforementioned editing modes and input modes, in order to improve convenience of an input operation, the original image editing mode and the normal input mode may be set in default so that the editing mode processing portion 43 or the input mode processing portion 44 is started only when the user wants to specify another mode, without selecting a mode for each input.

Moreover, the aforementioned method of specifying a start point and an end point at the time of selecting the input area 104 may be performed by dragging from a start point to an end point using an input device such as an electronic pen or by inputting positions of a start point and an end point as numerical values.

Figure 6:
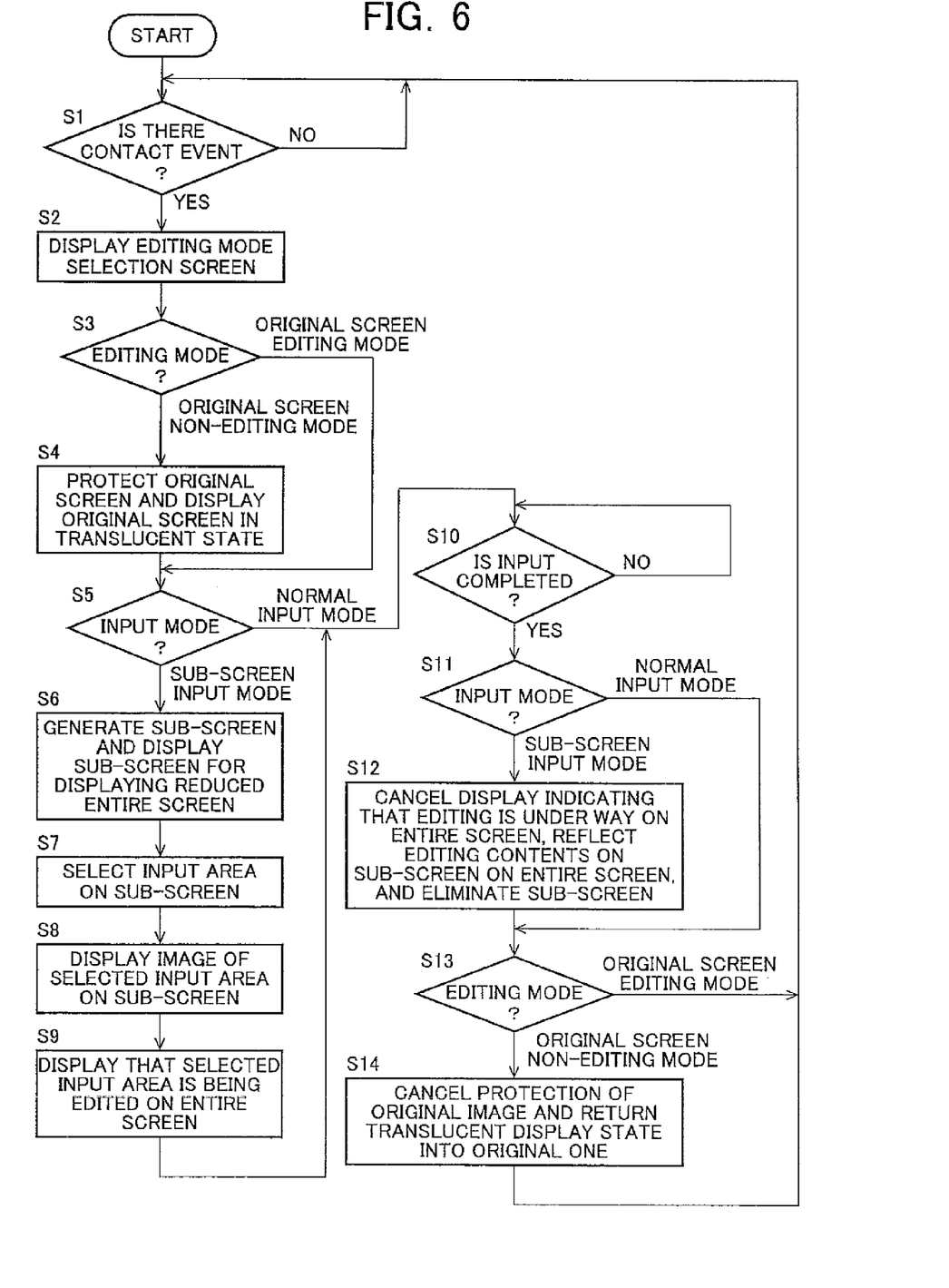
FIG. 6 is a flowchart illustrating an example of the processing in editing in the information display apparatus according to the present invention.

FIG. 6 is a flowchart illustrating an example of the processing for editing in the information display apparatus according to the present invention. Description will be given with reference to the block diagram of FIG. 2.

First, when there is a contact event by the input portion 20 when editing is not under way, the contact event is given from the contact monitoring portion 12 to the image input control portion 41 (step S1—YES). The image input control portion 41 starts the editing mode processing portion 43 and causes the image display portion 11 to display an editing mode selection screen by the control of the editing mode processing portion 43 (step S2).

In the editing mode selection screen, it is possible to select either the original image editing mode that permits the operation input to edit an original image that has been already displayed on the image display portion 11 or the original image non-editing mode that does not permit to edit the original image. When the editing mode processing portion 43 receives an editing mode instruction event that is input into the editing mode selection screen, it determines the editing mode of the instruction event (step S3).

When the editing mode is the original image non-editing mode as shown in FIG. 3B, image data of the original image before edited is stored in the image storage portion 42, the image data of the original image is protected, and in order to show that editing is not permitted, translucent image data of the original image is generated by the image generating portion 33 to be displayed on the image display portion 11 (step S4). Here, in addition to the translucent form, any display forms that are different from the forms indicating that editing is permitted can be set appropriately.

When the editing mode is the original image editing mode at step S3, and when the original image is displayed in a translucent form at step S4, the input mode processing portion 44 is started to determine an input mode (step S5). Here, the user is able to select either the normal input mode which permits operation input to whole area of the display screen displayed on the image display portion 11 or the sub-screen input mode which permits operation input to the sub-screen that is obtained by reducing the entire screen of the display screen.

When the input mode selected by the user is the sub-screen input mode as shown in FIGS. 5A and 5B, the sub-screen processing portion 45 is started and image data of the entire screen is firstly generated by the image generating portion 33. Thereafter, the image generating portion 33 generates image data of the sub-screen for displaying the reduced entire screen from the generated image data of the entire screen to display on the image display portion 11 (step S6).

When the image input control portion 41 receives a display completion event, the input area selection processing portion 46 is started. Then, the user is able to select an input area where operation input such as editing an image is performed from an image displayed on the sub-screen (step S7). Subsequently, when the input area selection processing portion 46 receives an input area selection event indicating that the input area is selected on the sub-screen, it displays an image of the selected input area on the sub-screen (step S8). Then, the image generating portion 33 displays that the selected input area is being edited on the entire screen displayed over the image display portion 11 (step S9). Here, display such as hatching is executed so that it can be determined that the image of the area selected as the input area is being edited. That is, the image of the selected area and the image of the not-selected area are displayed in different display forms.

The user performs an editing work such as drawing on the sub-screen after step S9, or the user performs an editing work in the normal input mode at step S5, so that an input completion event is input in the image input control portion 41 (step S10—YES), then the input mode processing portion 44 is started to determine an input mode (step S11).

Here, when the sub-screen input mode is selected as the input mode, the image generating portion 33 cancels the display indicating that editing is under way on the entire screen displayed over the image display portion so as to return it to the original display state, and reflects the contents of the edit additionally performed on the sub-screen in the original image before edited to display on the image display portion 11. At this time, the sub-screen is also eliminated from the display screen (step S12).

When the input mode is the normal input mode at step S11, and when the contents on the sub-screen are reflected on the entire screen and the sub-screen is eliminated at step S12, upon input of an input mode completion event, the editing mode processing portion 43 is started to determine an editing mode (step S13). Here, when the editing mode is the original image non-editing mode as shown in FIG. 3B, the protection of the original image is canceled to return the display state of the original image from the translucent state to the original state (step S14).

In addition, when the editing mode is the original image editing mode at step S13, and when the protection of the original image is canceled to turn the translucent display state to the original display state, the procedure returns to step S1 to perform a following input processing.

Note that, the procedure may return to step S7 without eliminating the sub-screen to receive selection of a new input area on the sub-screen when the new input area is set by letting a user determine whether or not setting a new input area in succession at the time when the editing contents are reflected on the entire screen at step S12 so that editing can be performed by setting another input area on the sub-screen in succession after reflecting the editing contents on the sub-screen on the entire screen at step S12.

Another embodiment of the present invention is constructed by a program for causing a computer to realize functions of each portion (the image input control portion 41, the editing mode processing portion 43, the input mode processing portion 44, the sub-screen processing portion 45, and the input area selection processing portion 46) of the information processing apparatus that constitutes the aforementioned embodiment. An object of the present invention is attained by writing the program in a recording medium in advance, storing the program recorded in the recording medium in a memory or a storage apparatus provided in a computer, and executing the program. In this case, the program itself read out from the recording medium realizes the functions of the aforementioned embodiment, and the program and the recording medium having the program recorded thereon also constitute the embodiment of the present invention.

Furthermore, it is also included when the program described above is executed together with an operating system or other application program, etc., according to the instructions of the program.

Note that, the program that realizes the functions of the aforementioned embodiment may be provided in any forms of recording medium including discs (for example, a magnetic disc and an optical disc, etc.,), cards (for example, a memory card and an optical card, etc.,), semiconductor memories (for example, a ROM and a nonvolatile memory, etc.,), and tapes (for example, a magnetic tape and a cassette tape, etc.,). Moreover, the aforementioned program stored in the storage apparatus through a network may be provided directly from a server computer. In this case, the storage apparatus of the server computer is also included in the recording medium of the present invention. In this way, the functions of the aforementioned embodiment are programmed and distributed, resulting that it is possible to reduce the cost and improve the portability and versatility.

The present invention will not be limited to above described embodiments and many modifications and alternations can certainly be made within the scope of the present invention.

According to the present invention, following effects are expected.

According to the present invention, a user can carry out easily an input work in an upper part or an end part which are out of reach of the user since an optional position can be selected on a reduced screen of an entire screen. That is, it becomes possible for the user to do an input operation such as editing easily by displaying the reduced screen of the entire screen as a sub-screen, selecting an area out of reach of the user in the sub-screen as an input-purpose sub-screen, and by displaying the input-purpose sub-screen close to the user. It is also possible to reflect editing contents on an original screen after completing the input.

Furthermore, according to the present invention, since display is shown so that it can be determined that editing is being performed, it becomes easier to determine whether or not being edited in addition, whether or not allowing editing of an original image can be selected, thus making it possible to reduce erroneous operations by carelessness. Since display is shown so that it can be determined that editing of an image is not permitted, it also becomes easier to determine whether or not the editing is permitted. As a result, operability of input operations in the information display apparatus can be improved.

The invention claimed is:

1. An information display apparatus, comprising:
    a display portion;
        an operation input portion for receiving operation input into an image displayed on the display portion;
        a display control portion for controlling a display screen of the display portion to display an entire screen of the display screen as a sub-screen;
        an input area selecting portion for selecting an input area where operation input into the image is performed from an image of the sub-screen in accordance with predetermined operation input to the operation input portion, wherein
    when an input area is selected from the image of the sub-screen, the display control portion controls the display portion to change from displaying the entire screen on the sub-screen to displaying an image of the input area on the sub-screen as an input-purpose sub-screen; and
    an original image editing mode that permits operation input for performing editing an original image which has been already displayed on the display portion or an original image non-editing mode that does not permit editing the original image is set selectively.

2. The information display apparatus as defined in claim 1, wherein
    a normal input mode that permits operation input into the whole area of the display screen of the display portion, or a sub-screen input mode that permits operation input into the image of the sub-screen displayed on the display screen of the display portion is set selectively, and when the sub-screen input mode is set, the display control portion reflects operation input performed into the image of the sub-screen to the entire screen for display.

3. The information display apparatus as defined in claim 1, wherein
    the input area selecting portion determines a start point and an end point in the image of the sub-screen and cuts out a rectangle having a diagonal connecting the start point and the end point as an input area.

4. The information display apparatus as defined in claim 1, wherein
    the display control portion controls the display portion to display the images which are permitted to edit and not permitted to edit in different display forms in order to make it possible to determine whether an image displayed on the display portion is the image which is permitted to edit or not.

5. The information display apparatus as defined in claim 1, wherein
    when an input area is selected from the image of the sub-screen, the display control portion controls the display portion to display an image of the input area on the sub-screen as an input-purpose sub-screen, and controls the display portion to display the image of the area selected as the input area and the image of the not-selected areas, among images displayed on the entire screen of the display portion, in different display forms in order to make it possible to determine that the image of the selected area is in editing.

6. The information display apparatus as defined in claim 1, which comprises a touch panel as the operation input portion.

7. A non-transitory computer-readable storage medium encoded with a computer program comprising instructions that, when executed, operate to cause a computer to realize the function of the information display apparatus as defined in claim 1.

8. A method for displaying information, comprising:

a step of selecting either an original image editing mode that permits operation input for performing editing of an original image which has been already displayed on a display portion or an original image non-editing mode that does not permit editing the original image, wherein editing of said original image includes drawing on the original image;

a step of displaying the images which are permitted to edit and not permitted to edit in different display forms in order to make it possible to determine whether an image displayed on the display portion is the image which is permitted to edit or not;

a step of selecting either a normal input mode that permits operation input into whole area of a display screen displayed on the display portion or a sub-screen input mode that permits operation input into a sub-screen that is displayed after reducing an entire screen of the display screen;

a step of selecting an input area where input operation into the image is performed from an image of the sub-screen when the sub-screen input mode is selected; and a step of displaying an image of the area selected as an input area and an image of the not-selected areas, among images displayed on the entire screen of the display portion, in different display forms in order to make it possible to determine that the image of the selected area is being edited.

9. A non-transitory computer-readable storage medium encoded with a computer program comprising instructions that, when executed, operate to cause a computer to realize the function of the information display apparatus as defined in claim 2.

10. A non-transitory computer-readable storage medium encoded with a computer program comprising instructions that, when executed, operate to cause a computer to realize the function of the information display apparatus as defined in claim 3.

11. A non-transitory computer-readable storage medium encoded with a computer program comprising instructions that, when executed, operate to cause a computer to realize the function of the information display apparatus as defined in claim 1.

12. A non-transitory computer-readable storage medium encoded with a computer program comprising instructions that, when executed, operate to cause a computer to realize the function of the information display apparatus as defined in claim 4.

13. A non-transitory computer-readable storage medium encoded with a computer program comprising instructions that, when executed, operate to cause a computer to realize the function of the information display apparatus as defined in claim 5.

14. A non-transitory computer-readable storage medium encoded with a computer program comprising instructions that, when executed, operate to cause a computer to realize the function of the information display apparatus as defined in claim 6.

* * * * *